United States Patent Office 2,996,477
Patented Aug. 15, 1961

2,996,477
POLYESTER COMPOSITION
Selma H. Long, Clarence E. Tholstrup, and Marshall T. Watson, Kingsport, Tenn., assignors to Eastman Kodak Company, Rochester, N.Y., a corporation of New Jersey
No Drawing. Filed June 18, 1959, Ser. No. 821,114
10 Claims. (Cl. 260—45.9)

This invention relates to a new polyester composition. More specifically, the present invention concerns an improved linear polyester of cyclohexane-1,4 dimethanol and terephthalic acid.

Resinous or solid polyester compositions are commonly subjected to elevated temperatures in the course of processing into useful items of commerce. Such processing methods as rolling, injection molding, extrusion and the like at elevated temperatures generally result in molecular weight breakdown and deterioration of physical properties of polyesters. Similarly, polyesters are subjected to heating in various uses such as in electrical insulation, in outdoor uses, and the like, that tend to degrade the polymer.

Various stabilizer additives are commonly added to commercial resins. However, many conventional stabilizers have not proved satisfactory in reducing thermal degradation in polyesters of cyclohexane-1,4-dimethanol and terephthalic acid.

It is an object of this invention to provide a new polyester composition comprising a polyester of cyclohexane-1,4-dimethanol and terephthalic acid having improved resistance to thermal degradation.

It is another object of this invention to provide a new polyester composition comprising a polyester of cyclohexane-1,4-dimethanol and terephthalic acid that can be melt extruded with a minimum of bubble formation.

It is likewise an object of this invention to provide a new polyester composition of improved thermal stability comprising a polyester of cyclohexane-1,4-dimethanol and a mixture of dicarboxylic acids including a major proportion of terephthalic acid.

These and other objects of the invention are accomplished by incorporating into a polyester composition comprising a polyester of cyclohexane-1,4-dimethanol and a dicarboxylic acid, of which at least a major proportion is terephthalic acid, a stabilizing amount of N,N'-diphenyl-p-phenylenediamine or N,N'-di-2-naphthyl-p-phenylenediamine.

The polyesters improved in accordance with the invention are described in detail in a copending application by Charles J. Kibler, Alan Bell and James G. Smith, U.S. Serial No. 554,639, filed December 22, 1955, now U.S. Patent No. 2,901,466. The subject polyesters are highly polymeric, normally solid or resinous, fiber-forming and film-forming, linear polymers resulting from the condensation of the diol, cyclohexane-1,4-dimethanol, and the dicarboxylic acid, terephthalic acid. A minor proportionate amount of another dicarboxylic acid can be used in combination with the terephthalic acid. The subject polyester has the following recurring structural unit

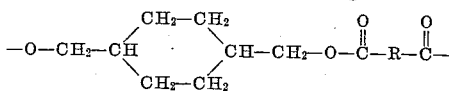

wherein R is a divalent hydrocarbon radical having 1 to 10 carbon atoms and wherein at least 50 mole percent of R is a radical derived from terephthalic acid having the formula

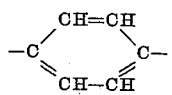

Examples of the dicarboxylic or dibasic acids that can be employed in minor proportionate amounts with terephthalic acid in preparing the subject polyesters include such straight chain and cyclic dicarboxylic acids as malonic acid, succinic acid, glutaric acid, adipic acid, pimelic acid, suberic acid, azelaic acid, sebacic acid, nonanedicarboxylic acid, decanedicarboxylic acid, α-ethyl suberic acid, isophthalic acid, orthophthalic acid, hexahydroorthophthalic acid, hexahydroterephthalic acid and the like.

The polyester compositions of the invention containing a stabilizing amount of N,N'-diphenyl-p-phenylenediamine or N,N'-di-2-naphthyl-p-phenylenediamine, hereinafter also referred to for convenience as DPPD and DNPD respectively. DPPD and DNPD can be suitably employed individually or in combination. These two additives have the following formulas

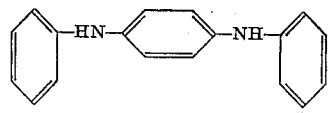

N,N'-diphenyl-p-phenylenediamine

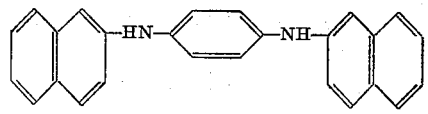

N,N'-di-2-naphthyl-p-phenylenediamine

The amount of DPPD or DNPD used in combination with the subject polyester can be varied in accordance with usual stabilization methods. Stabilizing amounts of DPPD or DNPD of .01% to 10% are generally utilized and .1% to 5% are preferably utilized, the amount of DPPD or DNPD being based on the weight of the subject polyester.

The present stabilizers can be incorporated into the subject polyesters by any of the conventional methods for incorporating such materials into resins or plastics such as hot-roll compounding, dry blending, deposition from solvents or combinations of such methods.

Polyesters prepared from the diol, cyclohexane-1,4-dimethanol, represent a new class of compounds in the polyester art. Such polyesters have many novel and improved properties over previously known polyesters. Likewise, the stabilization of the subject novel polyesters against thermal degradation presents a new problem in the art. Many of the conventional stabilizer materials such as hydroquinone, butylated hydroxytoluene, nordihydroquaiaretic acid, 2,6-di-tertiarybutyl-p-(dimethylaminomethyl)-phenol, 2,4,5-trihydroxybutyrophenone, phenothiazine, phenyl-2-naphthylamine and others have not proved satisfactory in reducing thermal degradation in the subject polyesters.

However, we have found that the specific compounds, N,N'-diphenyl-p-phenylenediamine and N,N'-di-2-naphthyl-p-phenylenediamine are unusually effective for imparting a high degree of thermal stability to the subject polyesters prepared from cyclohexane-1,4-dimethanol. One of the better known polyesters is a polyester prepared from the glycol, ethylene glycol, and from the dibasic acid, terephthalic acid, namely, polyethylene terephthalate. We have found that the stabilizers of the invention are substantially more effective in improving the present novel polyesters against thermal degradation than they are in polyethylene terephthalate.

In addition to being unusually effective in improving the heat resistant properties of the subject polyesters, DPPD and DNPD are useful in minimizing or preventing bubble formation in melt-extruded films of the subject polyester. Likewise, polyesters of the invention containing DPPD and DNPD have improved tensile strength, improved resistance to embrittleness, as well as many other improved physical properties.

The polyester compositions of the invention, because of their improved properties, can be employed for a wide variety of uses, and they can be cast, extruded, rolled, or molded into sheets, rods, tubes, piping, filaments, films and other shaped articles.

The invention is illustrated by the following examples of preferred embodiments thereof.

EXAMPLE 1

A sample of the polyester of cyclohexane-1,4-dimethanol (70% trans, 30% cis) and a mixture of 83 mole percent terephthalic acid and 17 mole percent isophthalic acid was prepared in accordance with the general method of Example 1 of copending Kibler et al. application, U.S. Serial No. 554,639 filed December 22, 1955, now U.S. Patent No. 2,901,466. The average molecular weight of the polyester was about 25,000 and it had an inherent viscosity of about 0.81. One part by weight N,N'-diphenyl-p-phenylenediamine (DPPD) was thoroughly mixed with the polyester in powder form and the resulting mixture pressed into films one mil in thickness in a press at 300° C. Other films containing no additive stabilizer were prepared in the same way. Samples of the resulting films were heated in air at 200° C. for 15 hours. When polyesters are heated in air they undergo breakdown in molecular weight. Molecular weight breakdown of the polyester samples were measured by the decrease in inherent viscosity $\{\eta\}$, defined by the equation, $$\{\eta\} = \frac{\ln(t/t_0)}{C}$$

where $t_0$ and $t$ are flow times respectively of pure solvent and a solution containing C grams of polymer per 100 cc. of solvent through a viscometer. The inherent viscosities were measured in a 60/40 mixture by weight of phenol/tetrachloroethane at a polymer concentration of 0.12 gram/100 cc. The polyester film containing the DPPD showed a change of only 18% in its inherent viscosity while the polyester film containing no additive showed a change of 71% in its inherent viscosity. Thus, the DPPD greatly improved the subject polyester with respect to thermal degradation thereof.

EXAMPLE 2

Samples of the polyester described in Example 1 containing 1% by weight of N,N'-di-2-naphthyl-p-phenylenediamine were extruded and stretched 170% lengthwise and 200% widthwise and heat set at 205° C. for about 2.5 minutes to form 1 mil thick films. Films containing no additive were also prepared. The resulting films were subjected to an embrittlement test on an M.I.T. Folding Indurance Tester, using A.S.T.M. standard method D643–43 method B, after being exposed for various periods of time in air at 160° C. The results of the test are summarized boy the data set out in Table 1 below.

*Table 1*

| Additive | Direction of Fold | Number of Folds to Break After Indicated Exposure | | | | |
|---|---|---|---|---|---|---|
| | | 2 Hours | 2 Days | 5 Days | 10 Days | 20 Days |
| None | Lengthwise | 9,867 | 6,661 | 2,046 | 3 | |
| 1% DNPD | do | 23,936 | 13,101 | 11,189 | 10,130 | 8,897 |
| 1% DNPD | Widthwise | 14,207 | | 11,611 | 8,577 | 5,814 |

EXAMPLE 3

Samples of 1.5 mil films of the polyester described in Example 1 were prepared by extruding, stretching 150% lengthwise and 165% widthwise and heat setting at 195° C. for about 2.5 minutes. The resulting films were treated by dipping in a 2% solution of N,N'-diphenyl-p-phenylenediamine (DPPD) in 50/50 methanol and tetrachloroethylene for 60 minutes at room temperature. The resulting treated films were rinsed in methanol, dried in air at room temperature for about 15 hours and exposed for various periods of time in air at 160° C. The samples were subjected to an embrittlement test on a fold endurance tester as described in Example 2. The results of the test are summarized by the data set out in Table 1 below.

*Table 2*

| Treatment Given Film Tested | Direction of Fold | Number of Folds to Break After Indicated Exposure | | | | |
|---|---|---|---|---|---|---|
| | | None | 2 Hours | 2 Days | 5 Days | 10 Days |
| None | Lengthwise | 13,200 | | 4,150 | 2,564 | 3 |
| Dipped in 2% DPPD | do | 19,926 | 12,051 | 6,237 | | 3,115 |

As can be seen by the data setout in Table 1 and in Table 2 above, the DPPD and DNPD additives of the invention significantly inhibit the formation of brittleness resulting from exposure to elevated temperatures in polyesters prepared from cyclohexane-1,4-dimethanol.

EXAMPLE 4

A further benefit of DPPD and DNPD in films of the present polyester is that such films have increased tensile modulus. Samples of polyester film containing 1% by weight of N,N'-di-2-naphthyl-p-phenylenediamine (DNPD) prepared as described in Example 2 had the following properties as summarized by the data set out in Table 3 below.

*Table 3*

[Tensile modulus, p.s.i.]

| Additive | Length | Width |
|---|---|---|
| None | 420,000 | 460,000 |
| 1% DNPD | 470,000 | 510,000 |

EXAMPLE 5

A polyester as described in Example 1 tends to form bubbles when melt-extruded under some conditions into films one mil in thickness. When bubbling occurs in films such as in films .5 to 100 mils in thickness, these films are unusable. However, the addition of 1% by weight of either N,N'-diphenyl-p-phenylenediamine or N,N'-2-naphthyl-p-phenylenediamine to the polyester prior to extrusion substantially eliminates bubbles in the extrudate.

EXAMPLE 6

Several polyesters were prepared with cyclohexane-1,4-dimethanol and terephthalic acid with minor proportionate amounts of other dicarboxylic acids as described in Example 1. The polyesters had average molecular weights of about 25,000. The prepared polyesters were prepared with the following dicarboxylic acid mixtures:

A. 83 mole percent terephthalic acid plus 17 mole percent isophthalic acid,
B. 60 mole percent terephthalic acid plus 40 mole percent hexahydroterephthalic acid,
C. 60 mole percent terephthalic acid plus 40 mole percent succinic acid, and
D. 60 mole percent terephthalic acid plus 40 mole percent sebacic acid;

these polyesters being referred to in Table 4 below as Polyesters A to D respectively. One percent by weight portions of N,N'-di-2-naphthyl-p-phenylenediamine (DNPD) were thoroughly mixed with the powder of each of the polyesters and the resulting mixtures pressed into films one mil in thickness at about 300° C. Samples of each of the prepared polyester films containing the DNPD additive, as well as films of the polyesters containing no additive, were heated in air at 200° C. for 15 hours. The results of the exposure of the various films are summarized by the data set out in Table 4 below in terms of decrease in inherent viscosity as described in Example 1 and as to physical condition.

Table 4

| Polyester Composition | Percent Decrease of Inherent Viscosity After Exposure | Condition of Film After Exposure |
|---|---|---|
| Polyester A | 76 | Brittle. |
| Polyester A+1% DNPD | 0 | Tough. |
| Polyester B | 85 | Brittle. |
| Polyester B+1% DNPD | 0 | Tough. |
| Polyester C | 94 | Brittle. |
| Polyester C+1% DNPD | 0 | Tough. |
| Polyester D | >96 | Brittle. |
| Polyester D+1% DNPD | 0 | Tough. |

Comparable improved properties are also obtained with 1% by weight of DPPD in the various described polyesters. Thus, the stabilizers of the invention can be employed to improve polyesters of cyclohexane-1,4-dimethanol and terephthalic acid modified with a minor proportionate amount of a wide variety of dicarboxylic acids. Such modifying dicarboxylic acids are frequently added to impart certain specific physical properties to the polyester such as dyeability, a specific melting point, etc.

EXAMPLE 7

Samples of polyester prepared from cyclohexane-1,4-dimethanol and terephthalic acid (unmodified with another dicarboxylic acid) were prepared in 1 mil films containing 1% by weight of N,N'-di-2-naphthyl-p-phenylenediamine (DNPD) by the method described in Example 1. Samples of the polyester film with and without the DNPD were heated in air at 185° C. for 4 days. The polyester film containing the DNPD showed no change in its inherent viscosity while the polyester film containing no additive showed a 70% change of inherent viscosity. The inherent viscosities were determined as described in Example 1. Comparable results are obtained when 1% by weight DPPD is substituted for the DNPD.

In Examples 8, 9, and 10 below the high degree of specificity of DPPD and DNPD for stabilizing the subject polyesters prepared using cyclohexane-1, 4-dimethanol against thermal degradation is illustrated. The substantially greater effectiveness of the stabilizers of the invention in the subject polyesters as compared to their effectiveness in the well known polyester, polyethylene terephthalate is illustrated. In addition, the ineffectiveness of several well known stabilizers in the subject polyesters is illustrated.

EXAMPLE 8

A polyester as described in Example 1 was prepared in the form of a film one mil in thickness containing 1% by weight N,N' - di - 2-naphthyl-p-phenylenediamine (DNPD). Likewise, polyethylene terephthalate having an inherent viscosity of about 0.61 in the form of a film one mil in thickness containing 1% by weight of N,N'-di-2-naphthyl-p-phenylenediamine was prepared. Films of the respective polyesters containing no stabilizer additives were also prepared. The prepared polyester films were exposed to air at 185° C. and the effectiveness of the stabilizer additive determined in terms of a rating defined as the ratio of exposure time required to bring about a 12% decrease in inherent viscosity of the stabilized polyester to the exposure time required to bring about the same percent decrease in the unstabilized polymer. The higher the rating or ratio, the more effective the stabilizer would be in the particular polyester. The rating for the combination of DNPD and the polyester of the invention was found to be greater than 12 and the rating for the combination of DNPD and the polyethylene terephthalate was found to be 1. Hence, DNPD is substantially more effective in the present specific polyesters than in polyethylene terephthalate.

EXAMPLE 9

A polyester as described in Example 1 was prepared in the form of films one mil in thickness containing 1% by weight of N,N'-di-2-naphthyl-p-phenylenediamine (DNPD) and 1% by weight of several well known stabilizers. The various films were heated in air at 185° C. for 12 days and the percent decrease in inherent viscosity noted. The results of the comparative tests are summarized by the data set out in Table 5 below.

Table 5

| Additive | Percent Decrease of Inherent Viscosity After Exposure |
|---|---|
| DNPD | 10 |
| N-Phenyl-N'-cyclohexyl-p-phenylenediamine | 64 |
| Nordihydroguaiaretic acid | 76 |
| Thiodipropionic acid | 83 |
| Phenyl-2-naphthylamine | 86 |
| 2,2-Thio-bis-(6-tertiary-butyl-p-cresol) | 86 |
| None | 90 |

EXAMPLE 10

Several polyester films containing 1% by weight of N,N'-diphenyl-p-phenylenediamine (DPPD), N,N'-di-2-naphthyl-p-phenylenediamine (DNPD) and three well-known stabilizers were prepared as described in Example 9 and heated in air at 200° C. for 48 hours and the percent decrease in inherent viscosity noted. The results of the test are summarized by the data set out in Table 6 below.

Table 6

| Additive | Percent Decrease of Inherent Viscosity After Exposure |
|---|---|
| DNPD | 14 |
| DPPD | 21 |
| "Santowhite" [1] | 69 |
| 2,4,5-Trihydroxybutyrophenone | 78 |
| Phenothiazine | 84 |

[1] A poly-alkylated phenol monosulfide, Monsanto Chemical Company

The unexpectedness of the high degree of effectiveness of DPPD and DNPD as stabilizers in the subject specific polyesters is pointed-up by the relative ineffectiveness of the various conventional stabilizers, including several amine compounds, in the present polyesters is illustrated by the data set out in Tables 5 and 6 above. Of particular interest is the relative ineffectiveness of phenothiazine as a stabilizer for the present polyesters, as phenothiazine is one of the best known stabilizers for synthetic ester lubricants and it is similar to DPPD and DNPD in that it is also a secondary aromatic amine.

Thus, the present invention provides novel polyester compositions having improved properties, particularly improved resistance to molecular breakdown due to elevated temperatures.

Although the invention has been described in considerable detail with reference to preferred embodiments thereof, it will be understood that variations and modifications can be effected within the spirit and scope of the invention as described hereinabove and as defined by the appended claims.

We claim:

1. A solid polyester composition having improved resistance to molecular breakdown due to elevated temperatures comprising a linear polyester consisting essentially of the recurring structural unit

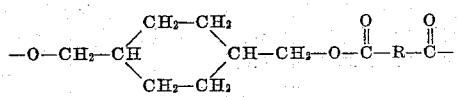

wherein R in said recurring structural unit is a divalent hydrocarbon radical having 1 to 10 carbon atoms and wherein at least 50 mole percent of the R radicals present in said polyester are radicals having the formula

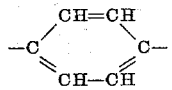

said composition containing substantially uniformly dispersed therein .01% to 10% by weight based on said linear polyester of an amine selected from the group consisting of N,N'-diphenyl-p-phenylenediamine and N,N'-di-2-naphthyl-p-phenylenediamine.

2. A solid polyester composition having improved resistance to molecular breakdown due to elevated temperatures comprising a linear polyester consisting essentially of the recurring structural unit

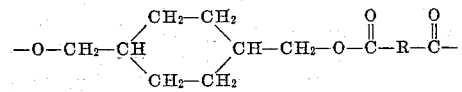

wherein R in said recurring structural unit is a divalent hydrocarbon radical having 1 to 10 carbon atoms and wherein at least 50 mole percent of the R radicals present in said polyester are radicals having the formula

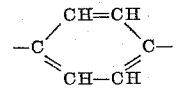

said composition containing substantially uniformly dispersed therein .1% to 5% by weight based on said linear polyester of N,N'-diphenyl-p-phenylenediamine.

3. A solid polyester composition having improved resistance to molecular breakdown due to elevated temperatures comprising a linear polyester consisting essentially of the recurring structural unit

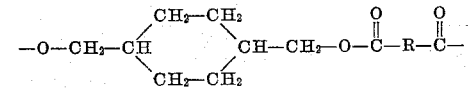

wherein R in said recurring structural unit is a divalent hydrocarbon radical having 1 to 10 carbon atoms and wherein at least 50 mole percent of the R radicals present in said polyester are radicals having the formula

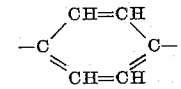

said composition containing substantially uniformly dispersed therein .1% to 5% by weight based on said linear polyester of N,N'-di-2-naphthyl-p-phenylenediamine.

4. A solid polyester composition having improved resistance to molecular breakdown due to elevated temperatures comprising a linear polyester consisting essentially of the recurring structural unit

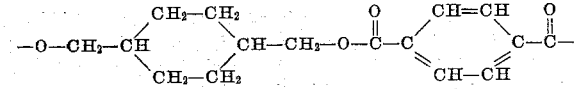

and containing substantially uniformly dispersed therein .1% to 5% by weight based on said linear polyester of N,N'-diphenyl-p-phenylenediamine.

5. A solid polyester composition having improved resistance to molecular breakdown due to elevated temperatures comprising a linear polyester consisting essentially of the recurring structural unit

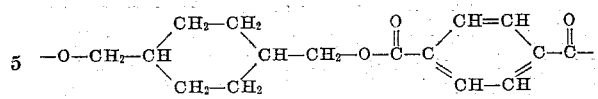

and containing substantially uniformly dispersed therein .1% to 5% by weight based on said linear polyester of N,N'-di-2-naphthyl-p-phenylenediamine.

6. A solid polyester composition having improved resistance to molecular breakdown due to elevated temperatures comprising a linear polyester consisting essentially of the recurring structural unit

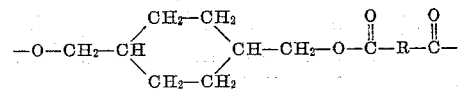

wherein R in said polyester consists essentially of a mixture of radicals having the formulas

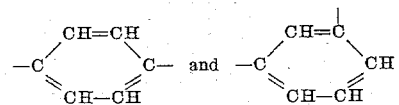

and wherein at least 50 mole percent of the R radicals present in said polyester are radicals having the formula

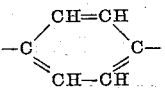

said composition containing substantially uniformly dispersed therein .1% to 5% by weight based on said linear polyester of N,N'-diphenyl-p-phenylenediamine.

7. A solid polyester composition having improved resistance to molecular breakdown due to elevated temperatures comprising a linear polyester consisting essentially of the recurring structural unit

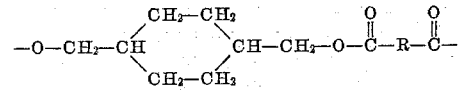

wherein R in said polyester consists essentially of a mixture of radicals having the formulas

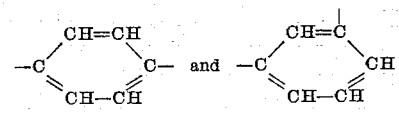

and wherein at least 50 mole percent of the R radicals present in said polyester are radicals having the formula

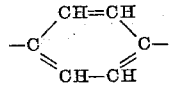

said composition containing substantially uniformly dispersed therein .1% to 5% by weight based on said linear polyester of N,N'-di-2-naphthyl-p-phenylenediamine.

8. A solid polyester composition having improved resistance to molecular breakdown due to elevated temperatures comprising a linear polyester consisting essentially of the recurring structural unit

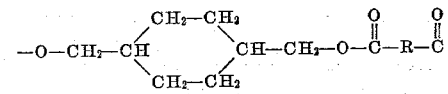

wherein R in said polyester consists essentially of a mixture of radicals having the formulas

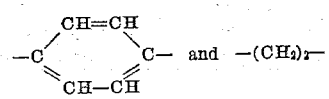

and wherein at least 50 mole percent of the R radicals present in said polyester are radicals having the formula

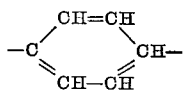

said composition containing substantially uniformly dispersed therein .1% to 5% by weight based on said linear polyester of N,N'-di-2-naphthyl-p-phenylenediamine.

9. A solid polyester composition having improved resistance to molecular breakdown due to elevated temperatures comprising a linear polyester consisting essentially of the recurring structural unit

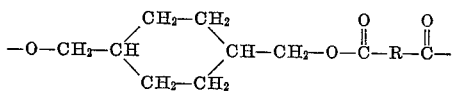

wherein R in said polyester consists essentially of a mixture of radicals having the formulas

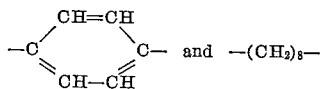

and wherein at least 50 mole percent of the R radicals present in said polyester are radicals having the formula

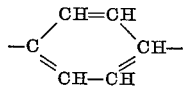

said composition containing substantially uniformly dispersed therein .1% to 5% by weight based on said linear polyester of N,N'-di-2-naphthyl-p-phenylenediamine.

10. A solid polyester composition having improved resistance to molecular breakdown due to elevated temperatures comprising a linear polyester consisting essentially of the recurring structural unit

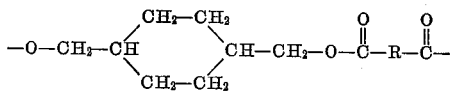

wherein R in said polyester consists essentially of a mixture of radicals having the formulas

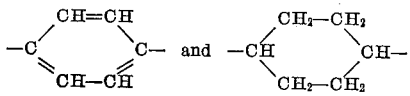

and wherein at least 50 mole percent of the R radicals present in said polyester are radicals having the formula

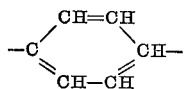

said composition containing substantially uniformly dispersed therein .1% to 5% by weight based on said linear polyester of N,N'-di-naphthyl-p-phenylenediamine.

References Cited in the file of this patent
UNITED STATES PATENTS

| | | |
|---|---|---|
| 2,379,978 | Meyer | July 10, 1945 |
| 2,901,466 | Kibler et al. | Aug. 25, 1959 |

FOREIGN PATENTS

| | | |
|---|---|---|
| 777,574 | Great Britain | June 26, 1957 |